(12) United States Patent
Kelley et al.

(10) Patent No.: US 6,425,024 B1
(45) Date of Patent: Jul. 23, 2002

(54) BUFFER MANAGEMENT FOR IMPROVED PCI-X OR PCI BRIDGE PERFORMANCE

(75) Inventors: Richard Allen Kelley, Apex, NC (US); Danny Marvin Neal, Round Rock, TX (US); Lawrence Dean Whitley; Adalberto Guillermo Yanes, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,044

(22) Filed: May 18, 1999

(51) Int. Cl.[7] ................................................ G06F 3/00
(52) U.S. Cl. ........................................ 710/56; 711/154
(58) Field of Search ............................ 710/56, 57, 52; 711/133, 134, 154, 156, 171, 172

(56) References Cited

U.S. PATENT DOCUMENTS

| | | | |
|---|---|---|---|
| 5,920,732 A | * | 7/1999 | Riddle ........................... 710/52 |
| 6,026,451 A | * | 2/2000 | Sreenivas ..................... 710/29 |
| 6,055,590 A | * | 4/2000 | Pettey et al. ................. 370/402 |

* cited by examiner

Primary Examiner—Matthew Kim
Assistant Examiner—Christian P. Chace

(74) Attorney, Agent, or Firm—Mark E. McBurney; Bracewell & Patterson, L.L.P.

(57) ABSTRACT

Buffer management for improved PCI-X or PCI bridge performance. A system and method for managing transactions across a PCI-X or PCI bridge, and a system and method of waiting for, increasing, and/or optimizing the available buffers for transaction size or sizes across a PCI-X or PCI bridge. Transactions are processed across the bridge, and the bridge has buffers with actual available buffer space used for receiving and processing the transactions. Transaction size of the transaction is determined. The system and method sets an available free block which is a set amount of available buffer space that is to be freed up before certain larger size transactions are processed. The system and method waits for the actual available buffer space to free up to and reach the available free block. The certain larger size transactions are then processed when the actual available buffer space has reached the available free block. The processing of the transaction involves accepting the transaction if the transaction size is not greater than the actual available buffer space, retrying the transaction for processing by the bridge when the transaction size is less than the available free block but greater than the actual available buffer space, retrying the transaction by the bridge when the transaction size is greater than the available free block and greater than the available buffer space until the available buffer space is greater than or equal to the available free block, and accepting the transaction and then disconnecting once the actual available buffers are filled or at an end of the transaction.

16 Claims, 3 Drawing Sheets

BUFFER MANAGEMENT FOR IMPROVED PCI-X OR PCI BRIDGE PERFORMANCE

BACKGROUND OF THE INVENTION

1. Technical Field

The present invention relates in general to buffer management for improved PCI-X or PCI bridge performance and in particular to a system and method for managing transactions across a PCI-X or PCI bridge. Still more particularly, the present invention relates to waiting for, increasing, and/or optimizing the available buffers for transaction size or sizes across a PCI-X or PCI bridge. Herein, the terms PCI-X or PCI bridge refer to a PCI-X to PCI-X or PCI to PCI bridge which connects two PCI buses. PCI-X is a high performance extension of the PCI bus which is currently being developed.

2. Description of the Related Art

Peripheral component interconnect (PCI) specifications have been developed and continued to be improved for communicating between a host computer, systems memory and various devices or adapters, such as devices on the bus, plug-in cards, or integrated adapters. The specifications for PCI have been detailed in PCI specification version 2.2 published in December 1998. PCI-X is a draft specification being developed by the PCI Special Interest Group (PCISIG) as an addendum to the PCI specification targeted to be released mid 1999. PCI-X is intended to be backward compatible. Therefore, both bridge interfaces must be capable of operating in either PCI or PCI-X mode (PCI to PCI, PCI-X to PCI-X, PCI to PCI-X, PCI-X to PCI). These specifications are incorporated by reference herein.

Various transactions, such as input/output (I/O) transactions and Direct Memory Access (DMA) transactions, occur across the PCI-X or PCI bridge between the host computer and the various devices and between I/O devices and system memory. Delayed transactions across such bridges require the master to repeat the transaction until it ceases to receive a retry and the transaction completes. However, the problem with delayed transactions is that the master has to continue to repeat and wait until appropriate buffers are available or it receives the data requested which results in the tie up or back up of transactions across the host bridge. Split transactions across such bridges avoids having the master wait and repeat transactions and allows commands to be accepted by a bridge and the results (data) returned later with the bridge acting as the master. However, split transactions may result in the decomposition of large transactions into smaller transactions. Smaller transactions processed across the bridge are typically less efficient in using the bus than large transactions.

For example, the current draft PCI-X specification provides programming capabilities of the size of split read requests (up to 4 k bytes). The PCI-X draft specification further provides the maximum number of outstanding requests that a device or adapter may be able to issue (up to 32 requests) and also requires that the device or adapter accept an outstanding read completion in one bus transaction without retry. A bus transaction may include an address phase, an attribute phase, a target response phase, one or more data phases, and a turn-around phase. A PCIX-to-PCIX (PtP) bridge is currently allowed to accept a read completion transaction or posted memory write transaction when one (1) ADB (an ADB is a block of data having 128 bytes that is aligned on a 128 byte address boundary) is available in the bridge buffer space. This availability of one (1) ADB of buffer space could result in larger read completions being broken down into smaller read completions when the PtP bridge accepted part of the read completion data and then disconnected. The problem exists in that when one (1) ADB transactions are buffered in the bridge, they will be forwarded to the other side of the bridge and executed as single ADB transfers. These single ADB transfers reduce the effective bandwidth of the bus where the data is being received and the bus where it is being forwarded.

The problem becomes especially worse when the system is busy. The problem starts when the system is busy, and the problem perpetuates itself until the system becomes less busy. An example of such a problem is explained by referring to FIG. 2. The PtP bridge 22 have buffers to receive and store data from bus 20 until the bridge 22 is able to obtain access to the other bus 24 and forward the data to the final destination. FIG. 2 shows the types of buffering needed in a PtP bridge 22, which are Posted Memory Write (PMW) buffer 30, Split Read Completion (SRC) and Split Write Completion (SWC) buffer 32, and Split Read Request (SRR) and Split Write Request (SWR) buffer 34. The transaction types for the PtP bridge 22 are Posted Memory Write (PMW), Split Read Completion (SRC), Split Write Completion (SWC), Split Read Request (SRR), and Split Write Request (SWR). A split completion may be a SRC or a SWC, and a split request may be a SRR or a SWR. The buffers shown in FIG. 2 are shown only for transactions from PCI-X bus 20 (bus #1) to PCI-X bus 24 (bus #2). Similar buffers exist for the transactions from PCI-X bus 24 (bus #2) to PCI-X bus 20 (bus #1) but are not shown in FIG. 2 since the single set of buffers is sufficient to describe the problem.

The problem may occur in either the PMW buffer 30 or the SRC buffer 32. The key problem is a result from managing the buffers in single ADB sizes as opposed to fixed buffers of fixed sizes. For example, the SRC buffer 32 is configured to hold 2 k bytes of data (16 ADBs), and the SRC buffer 32 is full of data that consists of 4 separate transactions of 4 ADBs each. The full SRC buffer 32 may be the result of bus #1 (bus 20) being faster than bus #2 (bus 24) or bus #2 becoming very busy with several read requests. The PtP bridge 22 is granted access to bus #2, and the PtP bridge 22 starts to forward one of the SRC from the SRC buffer 32. When one (1) ADB of data has been forwarded to bus #2, the PtP bridge 22 starts to accept a SRC from bus #1. Since bus #1 is faster than bus #2, the available ADB in the SRC buffer 32 is filled before the bridge 22 is able to empty a second ADB to bus #2. Thus, the bridge 22 needs to disconnect the bus #1 transaction at the first ADB boundary. As the sequence continues wherein the bridge 22 forwards each ADB's worth of data to bus #2, an ADB in the SRC buffer 32 is freed up which is filled by SRC transactions that are only one (1) ADB in size followed by a disconnect. The SRC buffer 32 in the bridge 22 is then filled with SRC transactions that are one (1) ADB in size, which do not efficiently use the bus which receive these forwarded transactions.

It would therefore be advantageous and desirable to provide buffer management for improved PCI-X or PCI bridge performance. It would be advantageous and desirable to provide a system and method for managing transactions across a PCI-X or PCI bridge. It would also be advantageous and desirable to provide a system and method that waits for, increases, and/or optimizes the available buffer space for transaction size or sizes across a PCI-X or PCI bridge and that times the optimal processing of respective transactions depending on transaction size and available buffer space.

SUMMARY OF THE INVENTION

It is therefore one object of the present invention to provide buffer management for improved PCI-X or PCI bridge performance.

It is another object of the present invention to provide a system and method for managing transactions across a PCI-X or PCI bridge.

It is a further object of the present invention to provide a system and method of waiting for, increasing, and/or optimizing of available buffer space for transaction size or sizes across PCI-X or PCI bridges and of timing for optimally processing respective transactions depending on the transaction sizes and the available buffer space.

The foregoing objects are achieved as is now described. Buffer management for improved PCI-X or PCI bridge performance. A system and method for managing transactions across a PCI-X or PCI bridge, and a system and method of waiting for, increasing, and/or optimizing the available buffers for transaction size or sizes across a PCI-X or PCI bridge. Transactions are processed across the bridge, and the bridge has buffers with actual available buffer space used for receiving and processing the transactions. Transaction size of the transaction is determined. The system and method sets an available free block which is a set amount of available buffer space that is to be freed up before certain larger size transactions (multiples of ADBs) are processed. The system and method waits for the actual available buffer space to free up and reach the available free block. Certain larger transactions are processed when the actual available buffer space has reached the available free block. The processing of the transaction involves accepting the transaction if the transaction size is not greater than the actual available buffer space, retrying the transaction for processing by the bridge when the transaction size is less than the available free block but greater than the actual available buffer space, retrying the transaction when the transaction size is greater than both the available free buffers and the available free block until the available buffers is greater than or equal to the available free block, and then accepting the transaction and then disconnecting once the actual available buffers are filled or at the end of the transfer.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is a system and method of buffer management in improving PCI-X or PCI bridge performance. The present invention discloses the waiting for, increasing, and/or optimizing of available buffer space for transaction size or sizes across PCI-X or PCI bridges and the timing for optimally processing respective transactions depending on the transaction sizes and the available buffer space. The present invention is not in any way limited to the specific apparatuses and methods disclosed in this specification, and any suitable system or method that waits, increases, and/or optimizes available buffer space for transaction size or sizes across such bridges and that provides timing for optimal processing of respective transactions may be implemented.

Figure 1:
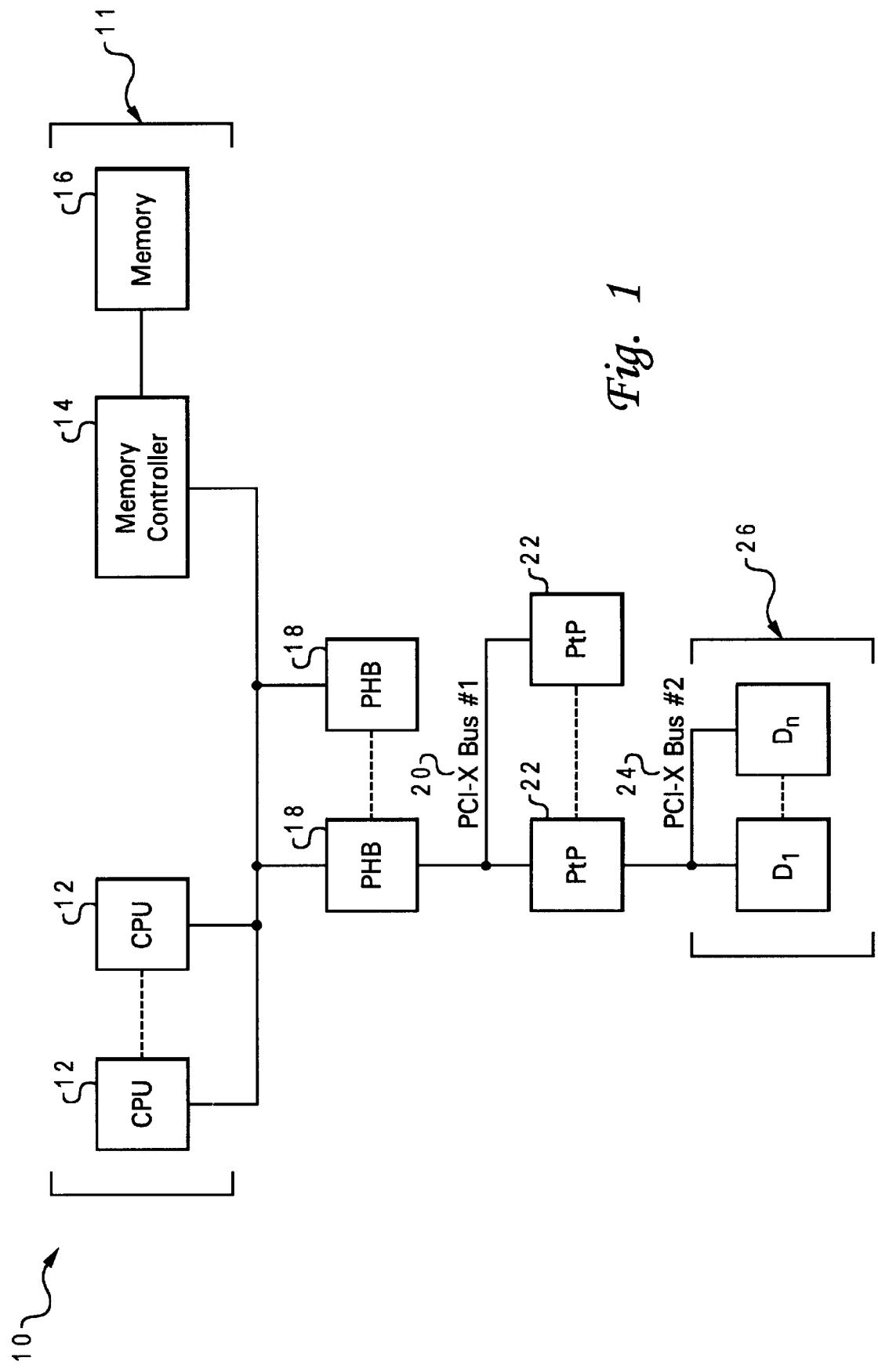
FIG. 1 is a block diagram of an overall system used to provide buffer management for improved PCI-X performance between a computer system and various interfaced devices.

With reference now to the figures and in particular with reference to FIG. 1, an overall system 10 that provides buffer management for improved PCI-X performance between a computer system 11 and various interfaced devices 26 is shown. The computer system 11 has a central processing unit(s) (CPU(s)) 12, a memory controller 14, and memory 16. The interfaced devices 26 comprise devices D1, D2, D3, . . . to DN. The computer system 11 has peripheral host bus (PHB) interfaces 18 that are able to interface with PCI-X devices. The PHB interfaces 18 are in communication and interface link with PCI-X bus #1 (bus 20). For ease of description herein, a PCI bus generated by a bridge capable of operating in PCI-X mode is referred to as a PCI-X bus. Bus #1 is in communication and interface link with PCI-X to PCI-X (PtP) bridges 22, and the bridges 22, in turn, are in communication and interface link with PCI-X bus #2 (bus 24). Bus #2 is in communication and interface link with the various devices 26.

Figure 2:
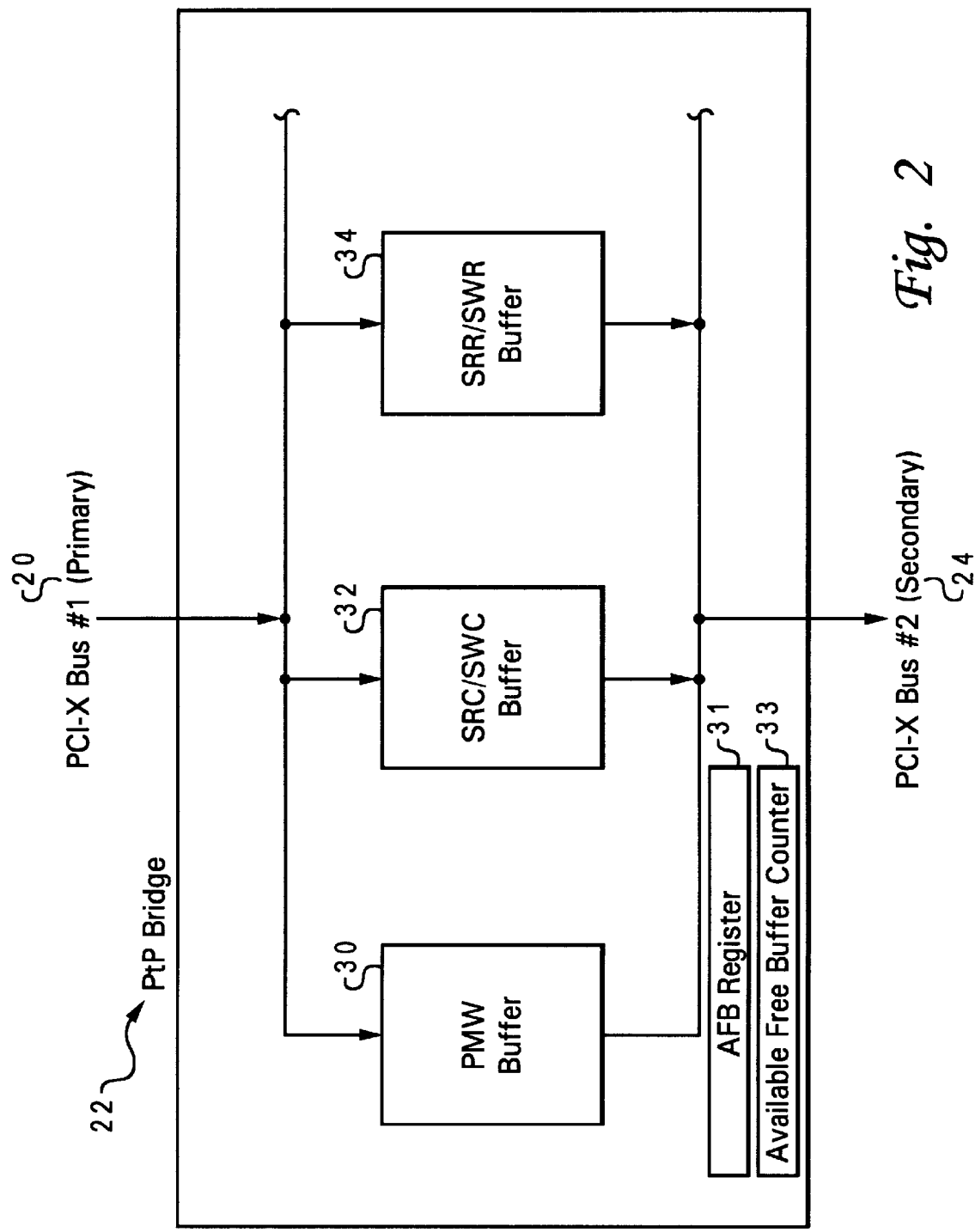
FIG. 2 is a block diagram of an example PCI-X to PCI-X (PtP) bridge illustrating the buffers contained therein.

With reference now to the figures and in particular with reference to FIG. 2, a PtP bridge 22 in communication and interface link between bus #1 (bus 20) and bus #2 (bus 24) is shown in more detail. PtP bridge 22 has various types of buffers. The buffers shown are Posted Memory Write (PMW) buffer 30, Split Read Completion (SRC) and Split Write Completion (SWC) buffer 32, and Split Read Request (SRR) and Split Write Request (SWR) buffer 34. As stated earlier, the transaction types for the PtP bridge 22 are Posted Memory Write (PMW), Split Read Completion (SRC), Split Write Completion (SWC), Split Read Request (SRR), and Split Write Request (SWR). A split completion may be a SRC or a SWC, and a split request may be a SRR or a SWR. The buffers shown in FIG. 2 are shown only for transactions from PCI-X bus 20 (bus #1) to PCI-X bus 24 (bus #2). Similar buffers exist for the transactions from PCI-X bus 24 (bus #2) to PCI-X bus 20 (bus #1) but are not shown in FIG. 2 since the single set of buffers is sufficient to describe the present invention. Also shown in FIG. 2 is an Available Free Block Register 31 which can be fixed or programmable and an Available Free Buffer Counter 33 which tracks the available buffers in number of ADBs. The present invention is not limited in any way to the specific buffers, transaction directions, or transaction types specifically disclosed herein, and any suitable buffer, transaction direction, or transaction type may be implemented or used with the present invention.

Referring to FIGS. 1 and 2, the system 10 is configured to increase and/or optimize the available buffer space for transaction size or sizes across PCI-X or PCI bridges and to time for optimally processing respective transactions depending on the transaction sizes and the actual available buffer space. The PtP bridge 22 controls and waits for available buffers or buffer space in the bridge 22 to have at least an optimal number of available space (such as available bytes) before processing or forwarding various transactions therethrough. The hardware of the system 10 as shown in FIGS. 1 and 2 are configured to accomplish such increase and optimization in transactions.

In reference to FIGS. 1 and 2, the transaction size may be increased from 1 ADB to 4 ADBs or more wherein an ADB is defined as a block of data having 128 bytes that is aligned on a 128 byte address boundary. The increase of such transaction sizes reduces the percent of overhead phases on the bus and thus increases the data transfer rate. The present invention requires that the bridge 22 wait for a set amount of space (such as 4 ADB of space) to be available in the buffer, such as the SRC buffer 32, before accepting a partial split completion and disconnecting from bus #1 (i.e. decomposition of larger transactions) to ensure that the larger transactions will be available to be forwarded to bus #2 resulting in more efficient use of bus #2.

System performance analysis or other means can be used to determine the optimum number of available buffers (in ADBs) to first free up, which is the Available Free Block (AFB) 31, before allowing decomposition to occur for optimal or best performance. The size of the AFB is fixed or is programmable. If the transaction size is equal to or less than the number of available buffers in the bridge 22, then the transaction will always be accepted by the bridge 22. If the transaction size is smaller than the AFB but larger than the number of available buffers, then the transaction will be retried by the bridge 22. Retry in PCI or PCI-X means that the target claims the access but disconnects with no data transferred, requiring the master to repeat the access until it is accepted with data transferring. If the transaction size is larger than the AFB and also larger than the number of available buffers, then the transaction will be accepted once the available buffers becomes greater than or equal to AFB but will be disconnected once the available buffers are filled or at the end of the transaction (transaction is decomposed into smaller transactions). The optimal AFB size varies for different types of applications, system configurations and devices or adapters supported by the system 10. The AFB size may also be different for transactions that occur from bus #1 to bus #2 in comparison with transactions that occur from bus #2 to bus #1.

Figure 3:
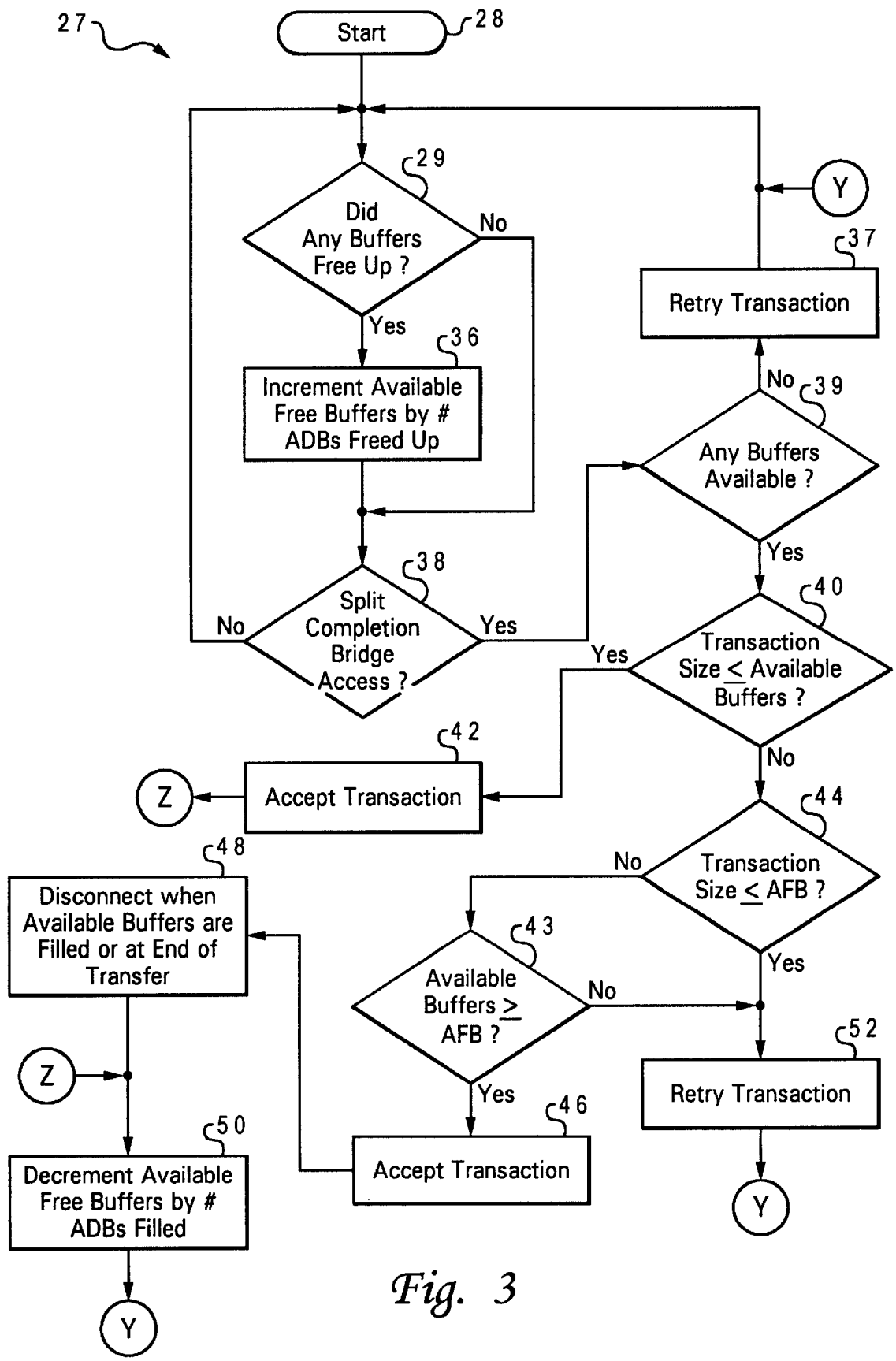
FIG. 3 is a flow chart of the algorithm for buffer management in providing improved PCI-X performance between a computer system and various interfaced devices.

Furthermore, methods or software algorithms may be provided for increasing and optimizing transactions across PCI-X or PCI bridges. With reference now to the figures and in particular with reference to FIG. 3, an algorithm 27 for buffer management in providing improved PCI-X performance between a computer system 10 and various interfaced devices 26 is shown. The present invention is not in any way limited to the specific algorithm disclosed in this specification, and any suitable buffer management algorithm for improving PCI-X performance may be used with the present invention. The algorithm 27 starts at block 28. At decision block 29, the algorithm 27 determines whether any additional available space, such as an ADB space, in the buffer (such as the buffers 30, 32, or 34 shown in FIG. 2) has freed up. If such space has not freed up, the algorithm 27 moves to decision block 38. However, if such additional space has freed up, the algorithm 27 moves to block 36 where an Available Free Buffers counter is incremented by the number of ADBs that were freed up and then moves to decision block 38. The Available Free Buffers counter is a counter that counts number of available buffer space in units of ADBs.

At decision block 38, the algorithm 27 looks for the next split completion access to the bridge 22 that may be waiting for the actual available space in the buffers to free up and reach the Available Free Block (AFB), which is the set amount of available buffer space (i.e. number of ADBs) that is to be freed up before processing of the transaction begins. If the next access has not occurred, then algorithm 27 loops back to decision block 29 to determine whether any additional buffer space in the buffer has again freed up. On the other hand, if the next access has occurred to the bridge 22, then algorithm 27 moves to decision block 39.

At decision block 39, the algorithm 27 determines if there is any buffer space available. If there is buffer space available, the algorithm 27 moves to decision block 40. On the other hand, if no buffer space is available, the transaction is retried at block 37, and the algorithm 27 moves to decision block 29 via connector Y to determine if any buffer space has freed up.

At decision block 40, the algorithm 27 determines whether the transaction size is less than or equal to the actual amount of available buffer space. If the transaction size is less than or equal to the available buffer space, then the algorithm 27 moves to block 42 to accept the transaction and moves to block 50 via connector Z wherein the Available Free Buffers counter is decremented by the number of ADBs filled by the accepted transaction. The algorithm 27 then loops back to decision block 29 via connector Y to determine whether any additional buffer space in the buffer has again freed up.

On the other hand, if the transaction size is not less than or equal to the actual amount of available buffers at decision block 40, then the algorithm 27 moves to decision block 44. At decision block 44, the algorithm 27 determines whether the transaction size is less than the Available Free Block (AFB) in an AFB register. The AFB register is a programmable register that indicates a decision setting in number of ADBs, that is, the AFB register is set at the AFB value, which is an amount of available buffer space (i.e. number of ADBs) that is to be freed up before processing of the transaction begins. Thus, if the transaction size is not less than the AFB at decision block 44, then the algorithm 27 moves to block 43 to determine if the available buffers are greater than or equal to AFB. If true, then the algorithm 27 moves to block 46 to accept the transaction and then to block 48 to disconnect from the bus (such as bus #1) when the actual available number of buffers are filled or when an end of a transaction transfer has occurred. The algorithm 27 then moves to block 50 to decrement the Available Free Buffer counter by the number of ADBs filled by the accepted transaction therein. However, if the transaction size is less than the AFB at decision block 44, then the algorithm 27 moves to block 52 where the bridge 22 will retry access indicating to the master to repeat the access later. The algorithm 27 then loops back to block 29 in determining whether any additional buffer space in the buffer has again freed up. If, however, the available buffers were not greater than or equal to the AFB in decision block 43, the algorithm 27 moves to block 52 where the transaction is retried.

Thus, the present invention discloses a system and method of waiting for, increasing, and/or optimizing of available buffer space for transaction size or sizes across PCI-X or PCI bridges and of timing for optimally processing respective transactions depending on the transaction sizes and the available buffer space.

While the invention has been particularly shown and described with reference to a preferred embodiment, it will be understood by those skilled in the art that various changes in form and detail may be made therein without departing from the spirit and scope of the invention.

What is claimed is:

1. A method of buffer management for improving performance of a PCI-X or PCI bridge wherein transactions are processed across the bridge and the bridge has buffers with actual available buffer space used for receiving and processing the transactions comprising the steps of:

determining transaction size of the transaction, setting an available free block which is a set amount of available buffer space that is to be freed up before certain larger size transactions are processed, waiting for the actual available buffer space to free up to and reach the available free block, determining whether the transaction size is greater than the actual available buffer space when the actual available buffer space has reached the available free block, accepting the transaction if the transaction size is not greater than the actual available buffer space, retrying the transaction by the bridge when the transaction size is less than the available free block but greater than the actual available buffer space, retrying the transaction by the bridge when the transaction size is greater than the available free block and greater than the available buffer space until the available buffer space is greater than or equal to the available free block, and accepting the transaction and then disconnecting once the actual available buffers are filled or at an end of the transaction.

2. The method according to claim 1 further comprising the step of:

using an available free block register for programming the set amount of the available buffer space that is to be freed up before the certain larger size transactions are processed.

3. The method according to claim 1 further comprising the step of:

using an available free buffers counter for tracking the actual available buffer space in the buffers.

4. The method according to claim 3 wherein the waiting step further comprises the steps of:

determining whether any additional buffer space has freed up in the buffers, incrementing the actual available buffer space tracked in the available free buffers counter by the additional buffer space if the additional buffer space has been freed up in the buffers, and determining whether a next access has occurred and whether the actual available buffer space has reached the available free block.

5. The method according to claim 3 further comprising the step of:

decrementing the actual available buffer space tracked in the available free buffers counter by an amount of filled buffer space when the transaction has been accepted.

6. A method of buffer management for improving performance of a PCI-X or PCI bridge wherein transactions are processed across the bridge and the bridge has buffers with actual available buffer space used for receiving and processing the transactions comprising the steps of:

determining transaction size of the transaction, setting an available free block which is a set amount of available buffer space that is to be freed up before certain larger size transactions are processed, waiting for the actual available buffer space to free up to and reach the available free block, and processing the transaction when the actual available buffer space has reached the available free block.

7. The method according to claim 6 wherein the processing step further comprises the steps of:

accepting the transaction if the transaction size is not greater than the actual available buffer space, retrying the transaction for processing by the bridge when the transaction size is less than the available free block but greater than the actual available buffer space, retrying the transaction by the bridge when the transaction size is greater than the available free block and greater than the available buffer space until the available buffer space is greater than or equal to the available free block, and accepting the transaction and then disconnecting once the actual available buffers are filled or at an end of the transaction.

8. A system of buffer management for improving performance of PCI-X or PCI bridges wherein transactions are processed across the bridge and the bridge has buffers with actual available buffer space used for receiving and processing the transactions comprising:

a computer system having PCI-X or PCI interfaces, a first PCI-X or PCI bus interfacingly coupled to the PCI-X or PCI interfaces, PCI-X or PCI bridges interfacingly coupled to the PCI-X or PCI bus, a second PCI-X or PCI bus interfacingly coupled to the PCI-X or PCI bridges, devices interfacingly coupled to the second PCI-X or PCI bus, wherein the system sets an available free block which is a set amount of available buffer space that is to be freed up before certain larger size transactions are processed, waits for the actual available buffer space to free up to and reach the available free block, and processes the transaction when the actual available buffer space has reached the available free block.

9. The system according to claim 8 wherein the system processes the transaction by accepting the transaction if the transaction size is not greater than the actual available buffer space, by retrying the transaction for processing by the bridge when the transaction size is less than the available free block but greater than the actual available buffer space, by retrying the transaction by the bridge when the transaction size is greater than the available free block and greater than the available buffer space until the available buffer space is greater than or equal to the available free block, and by accepting the transaction and then disconnecting once the actual available buffers are filled or at an end of the transaction.

10. The system according to claim 8 further comprises:

an available free block register coupled to the computer system wherein the available free block register is programmed with the set amount of the available buffer space that is to be freed up before the certain larger size transactions are processed.

11. The system according to claim 8 further comprises:

an available free buffers counter coupled to the computer system wherein the available free buffers counter is for tracking the actual available buffer space in the buffers.

12. The system according to claim 8 wherein each of the bridges further comprises:

buffers for processing the transactions.

13. The system according to claim 12 wherein the buffers are Posted Memory Write buffers.

14. The system according to claim 12 wherein the buffers are split read completion and split write completion buffers.

15. The system according to claim 12 wherein the buffers are split read request and split write request buffers.

16. A buffer management system, comprising:

a PCI-X or PCI bridge, having buffers with actual available buffer space, for receiving and processing transactions including determining transaction size of the transaction;

a register including a value representative of an available free block which is a set amount of available buffer space that is to be freed up before certain larger size transactions are processed; and a counter that determines when the actual available buffer space is freed up and reaches the available free block;

wherein said bridge processes the transaction when the actual available buffer space has reached the available free block.

* * * * *